US011416376B2

United States Patent
Marcin et al.

(10) Patent No.: US 11,416,376 B2
(45) Date of Patent: Aug. 16, 2022

(54) INVESTIGATIVE PLATFORM FOR SOFTWARE APPLICATION DEVELOPMENT AND PRODUCTION

(71) Applicant: Metawork Corporation, Wilmington, DE (US)

(72) Inventors: David Marcin, Saratoga, CA (US); David Michael Renie, Atherton, CA (US); Nicholas DeMonner, Redwood City, CA (US); Margaret Henry, Redwood City, CA (US)

(73) Assignee: Metawork Corporation, Wilmington, DE (US)

( * ) Notice: Subject to any disclaimer, the term of this patent is extended or adjusted under 35 U.S.C. 154(b) by 0 days.

(21) Appl. No.: 16/932,808

(22) Filed: Jul. 19, 2020

(65) Prior Publication Data

US 2022/0019518 A1    Jan. 20, 2022

(51) Int. Cl.
*G06F 11/36*    (2006.01)
(52) U.S. Cl.
CPC ........ *G06F 11/3644* (2013.01); *G06F 11/366* (2013.01); *G06F 11/3636* (2013.01); *G06F 11/3664* (2013.01)
(58) Field of Classification Search
CPC ............. G06F 11/3636; G06F 11/3644; G06F 11/366; G06F 11/3664
(Continued)

(56) References Cited

U.S. PATENT DOCUMENTS

2006/0167950 A1 * 7/2006 Vertes ................. G06F 11/3664 707/200
2012/0072423 A1   3/2012 Morrison et al.
(Continued)

FOREIGN PATENT DOCUMENTS

CN    110457190 A    11/2019

OTHER PUBLICATIONS

PCT Notification of Transmittal of the International Search Report and the Written Opinion of the International Searching Authority, or the Declaration, International Searching Authority, International Application No. PCT/US2021/039624, dated Oct. 28, 2021, 16 pages.

*Primary Examiner* — Wei Y Zhen
*Assistant Examiner* — Mohammed N Huda
(74) *Attorney, Agent, or Firm* — Cesari and McKenna, LLP (57) ABSTRACT

An investigative platform enables software developers to monitor and diagnose anomalies associated with application development and production. A client library interacts with a separate agent to instrument executable code of a user application. The client library transfers executable code and trace information captured from the user application to the agent to isolate the capture from the executing user application. The agent buffers, examines, and performs further processing (such as compression) on the captured traces, and sends the information as substantially compressed traces to an analysis and persistent storage (APS) infrastructure. A consumer service loads the information into a durable message queue for processing by stages of an analysis pipeline of the APS infrastructure. Processing by the stages of the analysis pipeline results in findings, such as trace amalgamation into cases. A data service of the APS infrastructure provides the processed information to a user interface infrastructure for graphic and interactive presentation reporting to a user.

20 Claims, 5 Drawing Sheets

(58) Field of Classification Search
USPC .......................................................... 717/125
See application file for complete search history.

(56) References Cited

U.S. PATENT DOCUMENTS

| | | |
|---|---|---|
| 2014/0317603 A1* | 10/2014 | Gataullin et al. ... G06F 11/3636 |
| | | 717/128 |
| 2014/0380282 A1* | 12/2014 | Ravindranath Sivalingam |
| | | et al. ................... G06F 11/3644 |
| | | 717/130 |
| 2016/0164757 A1 | 6/2016 | Pape |
| 2018/0150384 A1 | 5/2018 | Alaranta et al. |
| 2019/0213101 A1* | 7/2019 | Raviv et al. ......... G06F 11/3664 |
| 2019/0213109 A1 | 7/2019 | Chakra et al. |
| 2019/0303270 A1* | 10/2019 | Hoermann .......... G06F 11/3664 |

\* cited by examiner

INVESTIGATIVE PLATFORM FOR SOFTWARE APPLICATION DEVELOPMENT AND PRODUCTION

BACKGROUND

Technical Field

The present disclosure relates to software application development and production and, more specifically, to an investigative platform having observability tools configured to diagnose and solve anomalies associated with software application development and production.

Background Information

Conventional observability tools are typically used in both software development and production environments to infer internal states of an executing software application (e.g., executable code) from knowledge of external outputs. However, these tools generally have a limited view/observation of information for a user (software developer) to obtain sufficient information (e.g., internal state information) about executable code to correctly diagnose a malfunction or other anomalous behavior, such as a slowdown. That is, the tools typically collect information, such as logs, metrics and traces, from the executable code at runtime independently and with insufficient detail. As a result, an integrated view of sufficient fidelity across the collected information is not possible to aid diagnosis of a malfunction or anomaly, especially with respect to a historical view of specific operations manifesting the issue. For example, the tools may capture exceptions raised by the executable code that indicate a malfunction, but the root cause may be buried in a history of specific data values and processing leading to the exception. As such, examining a voluminous history of invocations and data changes across the collected information is often necessary to successfully diagnose the malfunction. Moreover, in production these tools are not generally configured for arbitrarily detailed information capture in an "always on" manner, but rather are typically used for testing or similar short-lived activities and then turned off.

In addition, an issue may arise during use of the tools for which there is no "visibility," and where the time to address and repair such an issue (problem) and its impact may depend on how quickly the developer can acquire visibility of the problem. A typical approach involves the software developer receiving notification of the problem in the production application, finding and examining relevant source code, defining and installing new points for collecting information about the code, deploying code with these new points, reviewing subsequently collected information, inferring what portions of the code may be creating the malfunction, and finally implementing any corrections to the code typically iteratively until the malfunction or anomalous behavior ceases. The developer may thereafter review any issues related to collected information that is logged and reported but may find nothing abnormal in the collected information. This approach may be continually repeated to no avail, which often hampers and even discourages problem solving. As a result, there is a need for on-demand, arbitrarily detailed trace capture based on always-on historical capture during production and in development environments. Such capture would enable gathering of enough detail when necessary and rendering of the voluminous collected information efficiently with sufficiently integrated view for effective diagnosis and root cause determination.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to an investigative platform configured to enable software developers to monitor and diagnose anomalies associated with application development and production. A client library of the investigative platform is loaded in a user application executing on a virtual machine instance of a virtualized computing environment or, for other embodiments, on an actual computer/machine. The client library interacts with a separate agent process of the platform to instrument executable code (e.g., symbolic text, interpreted bytecodes, machine code and the like visible to the client library) of the user application and, to that end, loads a capture configuration (dynamic configuration) that specifies information such as, inter alia, methods and associated arguments, variables and data structures (values), to instrument. The client library inspects the executable code to determine portions of the code to instrument based on rules or heuristics of the dynamic configuration, which represent a degree of fidelity (e.g., a frequency) of the executable code and information to trace at runtime. Capture points of the runtime application are implemented as callback functions (callbacks) to the client library, which are registered with a runtime system executing the user application.

Illustratively, the client library may examine a language runtime stack and associated call history during a capture interval, i.e., a method execution event triggering the callback, and gather symbolic information, e.g., symbols and associated source code (when available) from the runtime system, invocations of methods, arguments/variables (including local and instance variables) and return values of the methods, as well as any exceptions raised based on a capture filter. In an embodiment, the capture filter is a table having identifiers associated with the methods to instrument, such that presence of a particular identifier in the table results in trace capture of the method associated with the identifier during the capture interval. When an exception is raised, the client library captures detailed information for every method in the stack, even if it was not instrumented in detail initially. The client library may also inspect language runtime internals to determine values of data structures used by the application. In an embodiment, the dynamic configuration for data structures involves walking the structures based on a defined level of nesting (e.g., depth of the data structures) which may be specified per data structure type, instance, method, and the like.

In an embodiment, the client library transfers all captured trace information and executed executable code to the agent process (agent) via shared memory and/or Inter Process Communication (such as message passing via sockets, pipes and the like) to isolate the capture from the executing user application. The agent buffers, examines, and performs further processing (such as compression) on the captured traces, and sends the information as substantially compressed traces to an analysis and persistent storage (APS) infrastructure of the investigative platform. The agent may spool the substantially compressed traces to a near-line cloud service provider (CSP) to leverage the fast, reliable connection to reliable storage provided by a content distribution network (CDN) of the CSP, wherein the longevity of spooling traces in storage of the CDN may be governed by a policy.

In one or more embodiments, the APS infrastructure is organized as a plurality of components configured to perform substantial analysis and processing of the captured trace information (i.e., the substantially compressed traces). To that end, the APS infrastructure components are configured to provide, inter alia, durable and reliable storage of the captured information, as well as processing resources that may be allocated and applied (as needed) to facilitate analysis and further processing of the information without impacting the user application environment. Illustratively, the APS infrastructure components include a consumer service that receives the substantially compressed traces (ingested information) from the agent(s) and immediately loads the ingested information as a persistently stored message queue configured to provide durable storage for the information. The APS infrastructure further includes an analysis (e.g., data processing) pipeline organized as a plurality of stages configured to enable fast, reliable and reproducible decompression, extraction, transformation and analysis of information. Processing by analysis stages of the pipeline results in findings, such as trace amalgamation into cases. A data service of the APS infrastructure provides the processed information to a user interface infrastructure for graphic and interactive presentation reporting to a user.

DESCRIPTION

The disclosure herein is generally directed to an investigative platform having observability tools that enable software developers to monitor, investigate, diagnose and remedy anomalies as well as other deployment issues including code review associated with application development and production. In this context, an application (e.g., a user application) denotes a collection of interconnected software processes or services, each of which provides an organized unit of functionality expressed as instructions or operations, such as symbolic text, interpreted bytecodes, machine code and the like, which is defined herein as executable code and which is associated with and possibly generated from source code (i.e., human readable text written in a high-level programming language) stored in repositories. The investigative platform may be deployed and used in environments (such as, e.g., production, testing, and/or development environments) to facilitate creation of the user application, wherein a developer may employ the platform to provide capture and analysis of the operations (contextualized as "traces") to aid in executable code development, debugging, performance tuning, anomaly detection, and/or anomaly capture managed by issue.

As used herein, an anomaly denotes any departure from an expected norm of operation which leads a user application to deliver an unintended experience to an end user including, inter alia, (i) failures disrupting operations; (ii) exceptions being raised; (iii) performance outside a range (e.g., slower than an expected lowest bound or faster than an expected highest bound); (iv) lack of data integrity (e.g., empty fields of data structures, trampled data structures, incorrect pointer references which may lead to address space violations/exceptions); (v) data security violations, such as leaking personal identifiable information (PII); (vi) resource management errors (e.g., memory leaks from failure to correctly deallocate objects/memory); (vii) abnormal operating system resource consumption (e.g., abnormal/excessive input/output operations, such as network bandwidth consumed, storage operations and space consumed); and (viii) application process state abnormalities (e.g., deadlocks, zombie processes, hang-ups and the like).

In an exemplary embodiment, the investigative platform may be used in a production environment which is executing (running) an instance of the user application. The user application cooperates with the platform to capture traces (e.g., execution of code and associated data/variables) used to determine the cause of anomalies, errors, faults and inefficiencies in the executable code and which may be organized by issue typically related to a common root cause. To that end, the investigative platform may be deployed on hardware and software computing resources, ranging from laptop/notebook computers, desktop computers, and on-premises ("on-prem") compute servers to, illustratively, data centers of virtualized computing environments.

Figure 1:
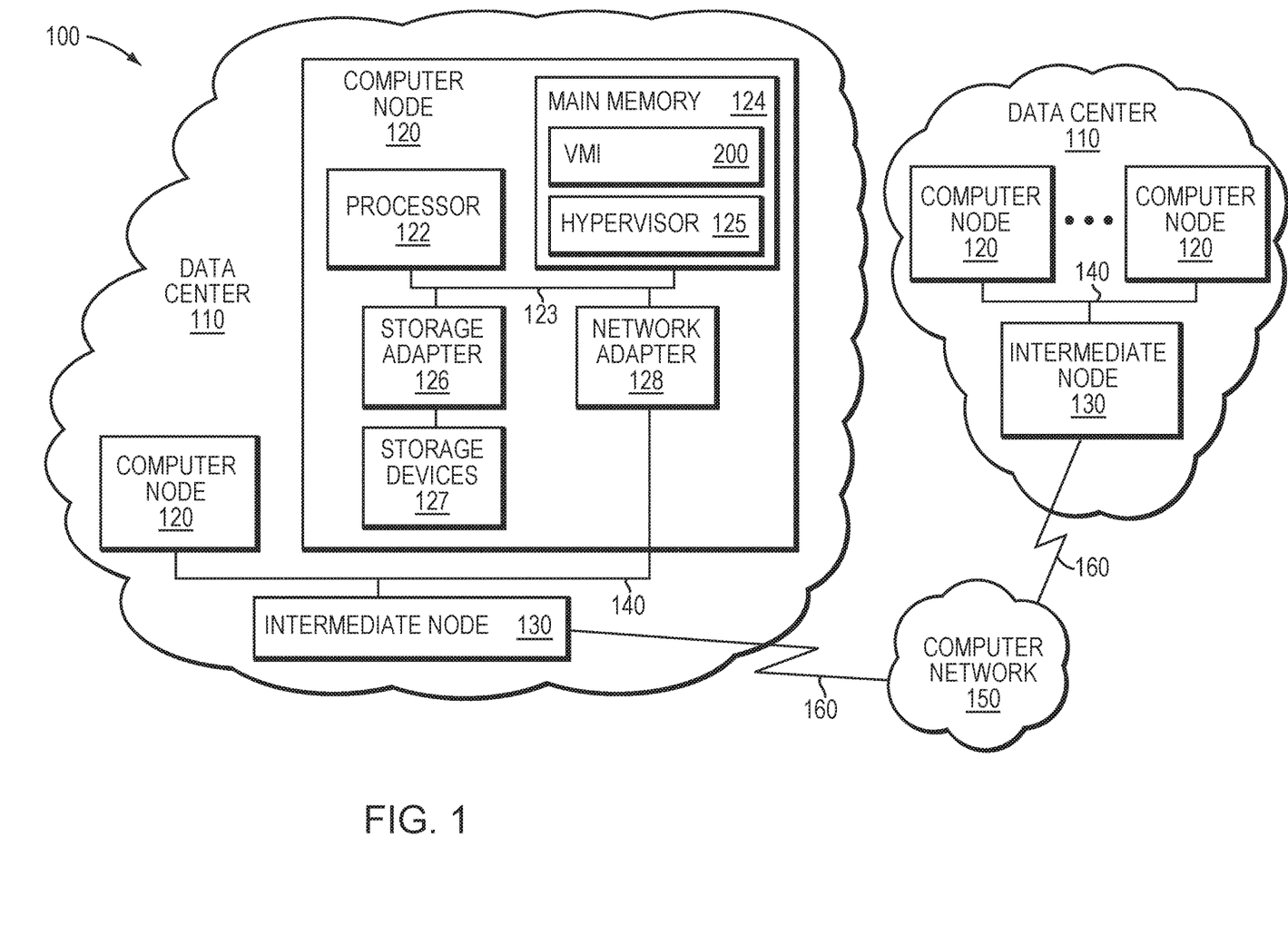
FIG. 1 is a block diagram of a virtualized computing environment.

FIG. 1 is a block diagram of a virtualized computing environment 100. In one or more embodiments described herein, the virtualized computing environment 100 includes one or more computer nodes 120 and intermediate or edge nodes 130 collectively embodied as one or more data centers 110 interconnected by a computer network 150. The data centers may be cloud service providers (CSPs) deployed as private clouds or public clouds, such as deployments from Amazon Web Services (AWS), Google Compute Engine (GCE), Microsoft Azure, typically providing virtualized resource environments. As such, each data center 110 may be configured to provide virtualized resources, such as virtual storage, network, and/or compute resources that are accessible over the computer network 150, e.g., the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information stored on storage devices 127, such as magnetic disks, solid state drives, or other similar media including network attached storage (NAS) devices and Internet Small Computer Systems Interface (iSCSI) storage devices. Accordingly, the storage adapter 126 may include input/output (I/O) interface circuitry that couples to the storage devices over an I/O interconnect arrangement, such as a conventional peripheral component interconnect (PCI) or serial ATA (SATA) topology.

The network adapter 128 connects the computer node 120 to other computer nodes 120 of the data centers 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, firewall or gateway that interconnects the LAN/VLAN local segments with remote network segments 160 illustratively embodied as point-to-point links, wide area networks (WANs), and/or virtual private networks (VPNs) implemented over a public network (such as the Internet). Communication over the network segments 140, 160 may be effected by exchanging discrete frames or packets of data according to pre-defined protocols, such as the Transmission Control Protocol/Internet Protocol (TCP/IP) and the User Datagram Protocol (UDP), although other protocols, such as the OpenID Connect (OIDC) protocol, the HyperText Transfer Protocol Secure (HTTPS), HTTP/2, and the Google Remote Procedure Call (gRPC) protocol may also be advantageously employed.

The main memory 124 includes a plurality of memory locations addressable by the processor 122 and/or adapters for storing software programs (e.g., user applications, processes and/or services) and data structures associated with the embodiments described herein. As used herein, a process (e.g., a user mode process) is an instance of a software program (e.g., a user application) executing in the operating system. The processor and adapters may, in turn, include processing elements and/or circuitry configured to execute the software programs, including an instance of a virtual machine and a hypervisor 125, and manipulate the data structures. The virtual machine instance (VMI) 200 is managed by the hypervisor 125, which is a virtualization platform configured to mask low-level hardware operations and provide isolation from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein. As will be understood by persons of skill in the art, in other embodiments, the instance of the user application may execute on an actual (physical) machine.

It will be apparent to those skilled in the art that other types of processing elements and memory, including various computer-readable media, may be used to store and execute program instructions pertaining to the embodiments described herein. Also, while the embodiments herein are described in terms of software programs, processes, services and executable code stored in memory or on storage devices, alternative embodiments also include the code, services, processes and programs being embodied as logic, components, and/or modules consisting of hardware, software, firmware, or combinations thereof.

Figure 2:
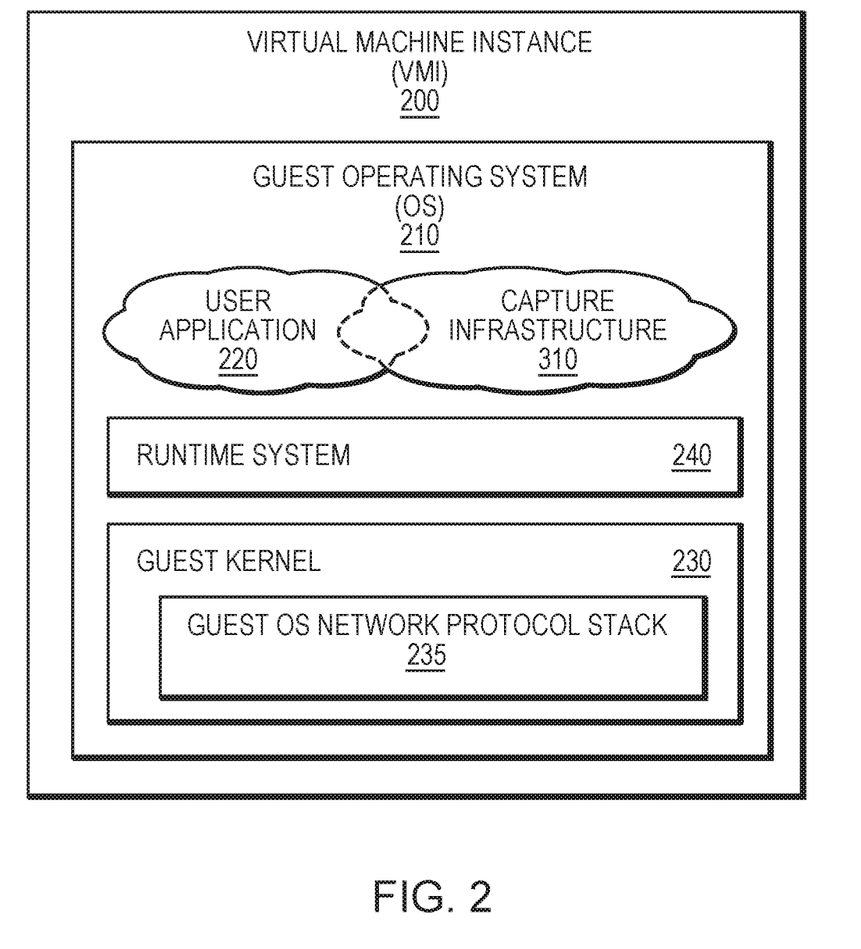
FIG. 2 is a block diagram of the virtual machine instance.

FIG. 2 is a block diagram of the virtual machine instance (VMI) 200. In an embodiment, guest operating system (OS) 210 and associated user application 220 may run (execute) in the VMI 200 and may be configured to utilize system (e.g., hardware) resources of the data center 110. The guest OS 210 may be a general-purpose operating system, such as FreeBSD, Microsoft Windows®, macOS®, and similar operating systems; however, in accordance with the embodiments described herein, the guest OS is illustratively the Linux® operating system. A guest kernel 230 of the guest OS 210 includes a guest OS network protocol stack 235 for exchanging network traffic, such as packets, over computer network 150 via a network data path established by the network adapter 128 and the hypervisor 125. Various data center processing resources, such as processor 122, main memory 124, storage adapter 126, and network adapter 128, among others, may be virtualized for the VMI 200, at least partially with the assistance of the hypervisor 125. The hypervisor may also present a software interface for processes within the VMI to communicate requests directed to the hypervisor to access the hardware resources.

A capture infrastructure 310 of the investigative platform may be employed (invoked) to facilitate visibility of the executing user application 220 by capturing and analyzing traces of the running user application, e.g., captured operations (e.g., functions and/or methods) of the user application and associated data/variables (e.g., local variables, passed parameters/arguments, etc.) In an embodiment, the user application 220 may be created (written) using an interpreted programming language such as Ruby, although other compiled and interpreted programming languages, such as C++, Python, Java, PHP, and Go, may be advantageously used in accordance with the teachings described herein. Illustratively, the interpreted programming language has an associated runtime system 240 within which the user application 220 executes and may be inspected. The runtime system 240 provides application programming interfaces (APIs) to monitor and access/capture/inspect (instrument) operations of the user application so as to gather valuable information or "signals" from the traces (captured operations and associated data), such as arguments, variables and/or values of procedures, functions and/or methods. A component of the capture infrastructure (e.g., a client library) cooperates with the programming language's runtime system 240 to effectively instrument (access/capture/inspect) the executable code of the user application 220.

As described further herein, for runtime systems 240 that provide first-class support of callback functions ("callbacks"), callbacks provided by the client library may be registered by the user application process of the guest OS 210 when the executable code is loaded to provide points of capture for the running executable code. Reflection capabilities of the runtime system 240 may be used to inspect file path(s) of the executable code and enumerate the loaded methods at events needed to observe and capture the signals. Notably, a fidelity of the captured signals may be configured based on a frequency of one or more event-driven capture intervals and/or a selection/masking of methods/functions to capture, as well as selection/masking, type, degree and depth of associated data to capture. The event-driven intervals invoke the callbacks, which filter information to capture. The events may be triggered by method invocation, method return, execution of a new line of code, raising of exceptions, and periodic (i.e., time based). For languages that do not provide such first-class callback support, a compiler may be modified to insert callbacks as "hooks" such that, when processing the executable code, the modified compiler may generate code to provide initial signals passed in the callbacks to the client library, as well as to provide results from the callbacks to the client library. In other embodiments, the callbacks may be added at runtime, by employing proxy methods (i.e., wrapping invocations of the methods to include callbacks at entry and/or exit of the methods) in the executable code. Moreover, the client library (which is contained in the same process running the user application 220) may examine main memory 124 to locate and amend (rewrite) the executable code and enable invocation of the callbacks to facilitate instrumentation on behalf of the investigative platform.

Figure 3:
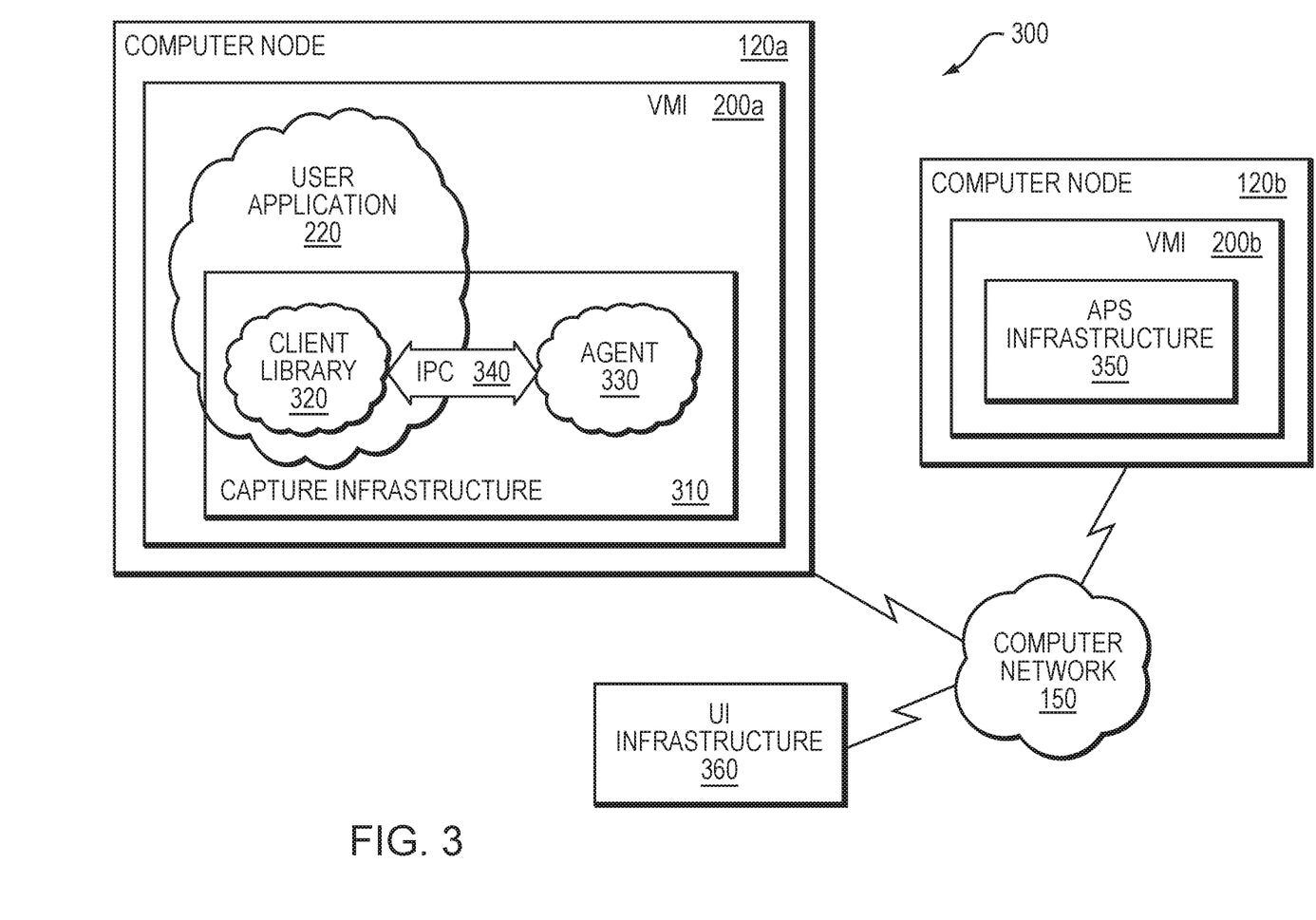
FIG. 3 is a block diagram of an investigative platform.

FIG. 3 is a block diagram of the investigative platform 300. In one or more embodiments, the investigative platform 300 includes the capture infrastructure 310 in communication with (e.g. connected to) an analysis and persistent storage (APS) infrastructure 350 as well as a user interface (UI) infrastructure 360 via computer network 150. Illustratively, the capture infrastructure 310 includes a plurality of components, such as the client library 320 and an agent 330, that interact (e.g., through the use of callbacks) to instrument the running executable code visible to the client library, initially analyze traces captured through instrumentation, compress and thereafter send the traces via the computer network 150 to the APS infrastructure 350 for comprehensive analysis and storage. The APS infrastructure 350 of the investigative platform 300 is configured to provide further multi-faceted and repeatable processing, analysis and organization, as well as persistent storage, of the captured traces. The UI infrastructure 360 allows a user to interact with the investigative platform 300 and examine traces via comprehensive views distilled by the processing, analysis and organization of the APS infrastructure 350. The capture infrastructure 310 illustratively runs in a VMI 200a on a computer node 120a that is separate and apart from a VMI 200b and computer node 120b on which the APS infrastructure 350 runs. Note, however, that the infrastructures 310 and 350 of the investigative platform 300 may run in the same or different data center 110.

In an embodiment, the client library 320 may be embodied as a software development kit (SDK) that provides a set of tools including a suite of methods that software programs, such as user application 220, can utilize to instrument and analyze the executable code. The client library 320 illustratively runs in the same process of the user application 220 to facilitate such executable code instrumentation and analysis (work). To reduce performance overhead costs (e.g., manifested as latencies that may interfere with user application end user experience) associated with executing the client library instrumentation in the user application process, i.e., allocating the data center's processing (e.g., compute, memory and networking) resources needed for such work, the client library queries the runtime system 240 via an API to gather trace signal information from the system, and then performs a first dictionary compression and passes the compressed signal information to an agent 330 executing in a separate process. The agent 330 is thus provided to mitigate the impact of work performed by the client library 320, particularly with respect to potential failures of the user application.

Illustratively, the agent 330 is spawned as a separate process of the guest OS 210 to the user application 220 and provides process isolation to retain captured traces in the event of user process faults, as well as to prevent unexpected processing resource utilization or anomalies from negatively impacting execution of the user application 220. As much processing as possible of the captured traces of the executable code is offloaded from the client library 320 to the agent 330 because overhead and latency associated with transmission of information (e.g., the captured traces) between operating system processes is minimal as compared to transmission of the information over the computer network 150 to the APS infrastructure 350. In an embodiment, the client library 320 and agent 330 may communicate (e.g., transmit information) via an Inter Process Communication (IPC) mechanism 340, such as shared memory access or message passing of the captured trace signals. Thereafter, the agent 330 may perform further processing on the captured traces, such as a second dictionary compression across captured traces, and then send the re-compressed captured traces to the APS infrastructure 350 of the investigative platform 300 over the computer network 150 for further processing and/or storage.

The embodiments described herein are directed to an investigative platform that is configured to enable software developers to monitor, diagnose and solve anomalies associated with application development and production. A user links the client library 320 to the user application 220, e.g., after the client library is loaded into a process of the application and, thereafter, the client library (at initialization and thereafter on-demand) loads a dynamic configuration that specifies information such as, inter alia, methods and associated arguments, variables and data structures (values) to instrument as well as a fidelity of capture (i.e., a frequency and degree or amount of the information detail to gather of the running application) expressed as rules. Essentially, the dynamic configuration acts as a filter to define the type and degree of information to capture. The client library 320 inspects the executable code to determine portions of the code to instrument based on the rules or heuristics of the dynamic configuration. Capture points of the runtime application are implemented as callbacks to the client library 320 which, as noted, are registered with the runtime system executing the user application 220 and invoked according to the dynamic configuration. The dynamic configuration may be loaded from various sources, such as from the agent 330, the APS infrastructure 350, and/or via user-defined sources such as files, environment variables and graphically via the UI infrastructure 360.

Figure 4:
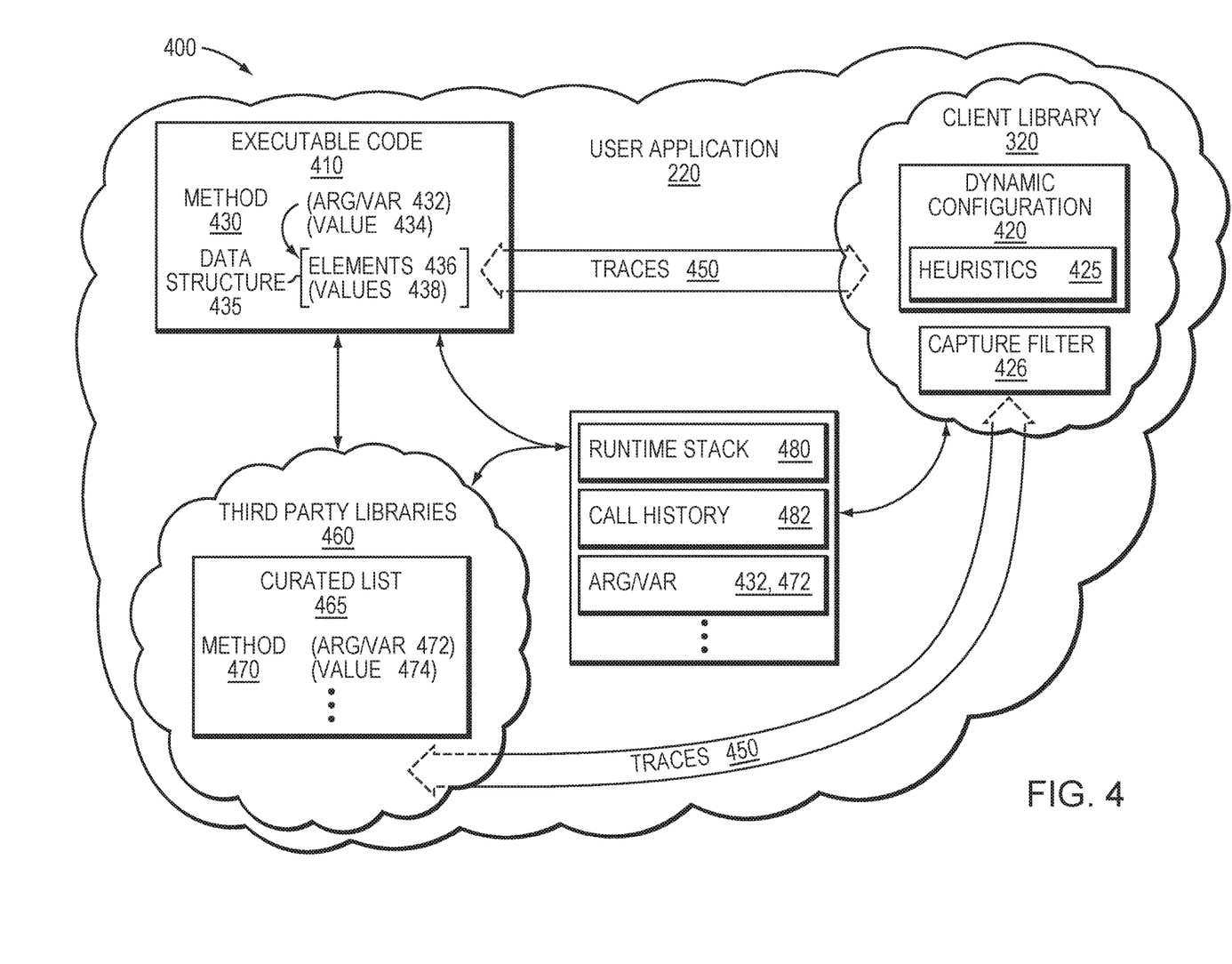
FIG. 4 illustrates a workflow for instrumenting executable code using a dynamic configuration.

FIG. 4 illustrates a workflow 400 for instrumenting executable code 410 using a dynamic configuration 420. Since there is only a finite amount of processing resources available for the client library 320 to perform its work, the technique optimizes the use of the processing resources in accordance with the dynamic configuration 420, which represents a degree of fidelity of executable code 410 and information to capture at runtime as traces of the executing methods and data of the executable code. In one or more embodiments, default rules or heuristics 425 of the configuration 420 are employed to dynamically capture the traces 450, wherein the default heuristics 425 may illustratively specify capture of (i) all methods 430 of the executable code 410 as well as (ii) certain dependencies on one or more third-party libraries 460 that are often mis-invoked (i.e., called with incorrect parameters or usage). A capture filter 426 is constructed (i.e., generated) from the dynamic configuration based on the heuristics. Changes to the dynamic configuration 420 may be reloaded during the capture interval and the capture filter re-generated. In this manner, the executable code 410 may be effectively re-instrumented on-demand as the capture filter screens the traces 450 to capture.

Illustratively, the capture filter 426 may be embodied as a table having identifiers associated with methods to instrument, such that presence of a particular identifier in the table results in trace capture of the method associated with the identifier during the capture interval. That is, the capture filter is queried (e.g., the capture table is searched) during the capture interval to determine whether methods of the event driving the capture interval are found. If the method is found in the capture filter 426, a trace 450 is captured (i.e., recorded). Notably, the method identifiers may depict the runtime system representation of the method (e.g., symbols) or a memory address for a compiled user application and runtime environment. In an embodiment, the capture filter may be extended to include capture filtering applied to arguments, variables, data structures and combinations thereof.

A default dynamic configuration is based on providing a high fidelity (i.e., capture a high trace detail) where there is a high probability of anomaly. As such, the dynamic configuration may trade-off "high-signal" information (i.e., information very useful to debugging, analyzing and resolving errors) against consistently capturing a same level of detail of all invoked methods. For example, the third-party libraries 460 (such as, e.g., a standard string library or regular expression library) are typically widely used by software developers and, thus, are generally more reliable and mature than the user application 220 but are also likely to have incorrect usage by the user application. As a result, the heuristics 425 primarily focus on methods 430 of the user application's executable code 410 based on the assumption that it is less developed and thus more likely where errors or failures are to arise. The heuristics 425 (and capture filter 426) are also directed to tracing invocation of methods of the third-party libraries 460 by the user application via a curated list 465 of methods 470 of the third-part library having arguments/variables (arg/var) 472 and associated values 474 deemed as valuable (high-signal) for purposes of debugging and analysis. Notably the curated list 465 may be folded into the capture filter 426 during processing/loading of the dynamic configuration 420. That is, the curated list includes high-signal methods of the third-party library most likely to be mis-invoked (e.g., called with incorrect calling parameters) and, thus, benefits debugging and analysis of the user application 220 that uses the curated high-signal method. The technique utilizes the available processing resources to capture these high-signal method/value traces 450.

Illustratively, the client library 320 may examine a language runtime stack 480 and associated call history 482 using, e.g., inspection APIs, to query the runtime system during a capture interval to gather symbolic information, i.e., symbols and associated source code (when available), from the runtime system 240, invocations of methods 430, 470, associated arguments/variables 432, 472 (including local and instance variables), return values 434, 474 of the methods, and any exceptions being raised. Notably, the gathered symbolic information of a captured trace may include one or more of (i) high-level programming text processed by the runtime system, which may be derived (generated) from source code stored in repositories; and (ii) symbols as labels representing one or more of the methods, variables, data and state of the executable code. When an exception is raised, the client library 320 captures detailed information for every method in the stack 480, even if was not instrumented in detail initially as provided in the dynamic configuration 420. That is, fidelity of trace capture is automatically increased (e.g., from a first level to a second level) during the capture interval in response to detecting a raised exception. Note that in some embodiments, this automatic increase in trace capture detail may be overridden (superseded) in the dynamic configuration by a manual override. In some embodiments, the runtime system executable code 410 may have limited human readability (i.e., may not be expressed in a high-level programming language) and, in that event, mapping of symbols and references from the executable code 410 to source code used to generate the executable code may be gathered from the repositories by the APS infrastructure 350 and associated with the captured trace.

The client library 320 may also inspect language runtime internals to determine values of data structures used by the application 220. In an embodiment, the dynamic configuration 420 for data structures may involve "walking" the structures and capturing information based on a defined level of nesting (e.g., a nested depth of the data structures) which may be specified per data structure type, instance and/or method as provided in the dynamic configuration 420. As stated previously for language implementations that do not provide first-class callback support, a compiler may be modified to insert callbacks as "hooks" such that, when processing the executable code 410, the modified compiler may generate code to provide initial signals passed in the callbacks to the client library 320 which may inspect the stack 480 directly (e.g., examine memory locations storing the stack). In other embodiments, the client library may add callbacks at runtime in the executable code via proxy methods (i.e., wrapping invocations of the methods to include the callbacks at entry and/or exit of the methods). Moreover, the client library (which is contained in the same process running the user application 220) may examine main memory 124 to locate and amend (rewrite) the executable code and enable invocation of the callbacks to facilitate instrumentation on behalf of the investigative platform.

Figure 5:
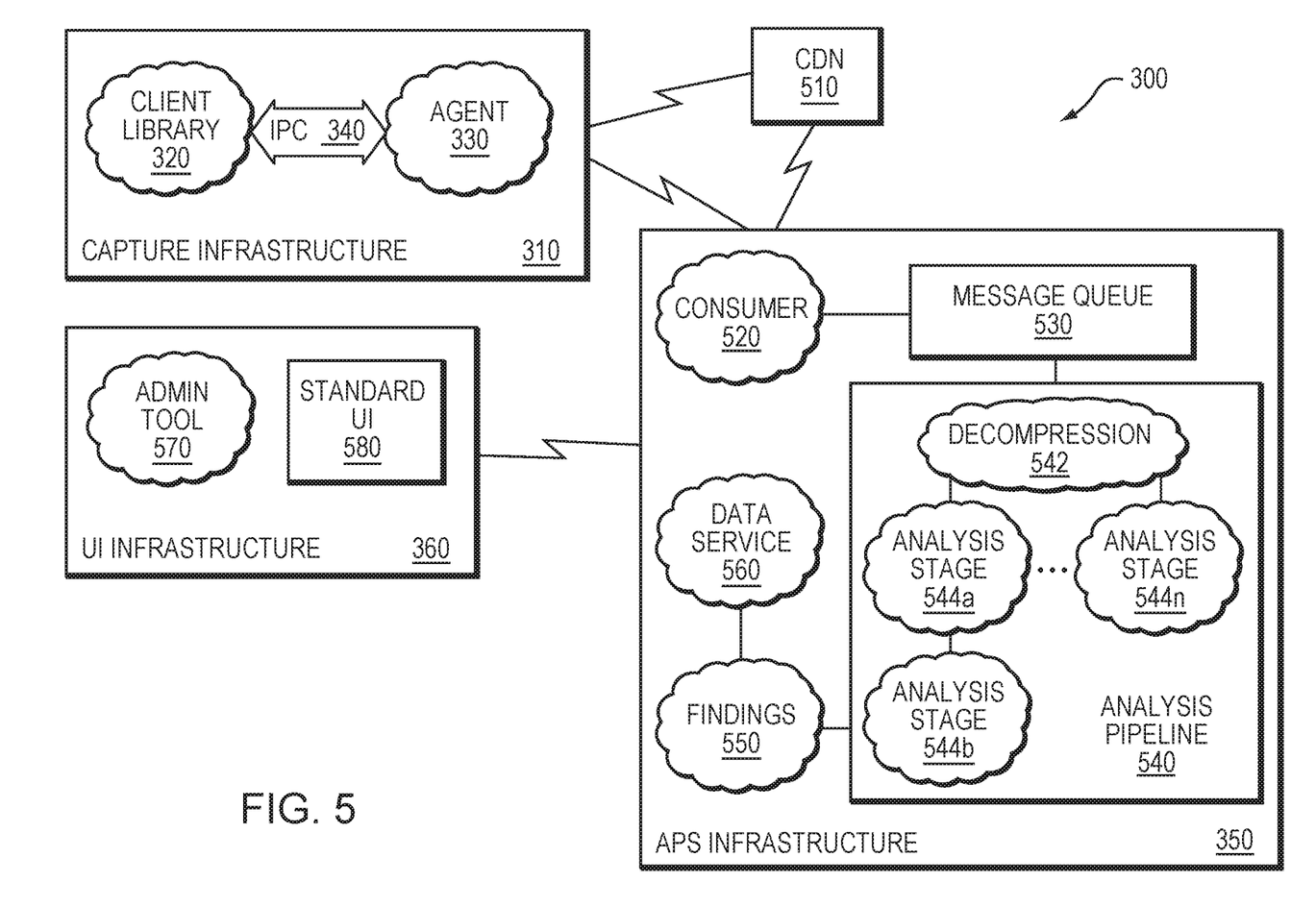
FIG. 5 is a block diagram of components of the investigative platform.

FIG. 5 is a block diagram of components of the investigative platform. Once spawned, the agent 330 connects to the client library 320 and the APS infrastructure 350 so that it may receive the captured trace information from the client library 320 for subsequent transmission to the APS infrastructure 350. As noted, the client library performs a first dictionary compression on the captured information and then passes the compressed information and executed executable code to the agent 330 executing in a separate process via shared memory and/or the IPC mechanism 340 (such as message passing via sockets, pipes and the like) to isolate the capture from the executing user application 220. The agent buffers (temporarily stores), examines, and performs further processing on the captured traces, such as a second dictionary compression across captured traces, and sends the re-compressed captured traces (information) as substantially compressed traces to the APS infrastructure of the investigative platform. As much processing (as possible) of the captured trace information is moved from the client library 320 to the agent to minimize the processing resource impact of the user application 220. The agent 330 is thus provided to mitigate the impact of work performed by the client library 320, particularly with respect to potential failures of the user application. As such, the agent 330 is spawned in a process that is separate and isolated from the user application process. Such process isolation also ensures that unexpected resource utilization or anomalies (errors/failures) do not impact the user application. Also, if the user application 220 experiences a critical failure, the agent 330 is still able to package (i.e., compress) and send the captured traces (information) to the APS infrastructure 350.

In an embodiment, the agent 330 may spool the substantially compressed traces to a near-line CSP to leverage the fast, reliable connection to reliable storage provided by a Content Distribution Network (CDN) 510 of the CSP. The APS infrastructure 350 may then "pull" the substantially compressed captured traces from the CDN 510. Alternatively, the agent may "push" the substantially compressed traces to the APS infrastructure 350 as communication link speed to the APS infrastructure permits. Note that the capture infrastructure components of the investigative platform 300 are configured to handle "back pressure" from the APS infrastructure 350 and/or CDN 350 due to communication link congestion/speed limitations and/or processing/storage resource overloaded in the APS infrastructure and/or CDN. Notably, the longevity of spooling traces in storage of the CDN 510 (e.g., long-term v. short-term) may be governed by a policy, such as least cost. Another policy may dictate sampling of historical trace information to preserve that information by priority of class, e.g., preserve anomalous traces over healthy traces, while abiding by certain conditions, such as maintaining a minimum number of healthy traces for comparison purposes. The agent 330 may also spool the substantially compressed traces to a local disk or a network attached storage device (e.g., in an on-prem deployment).

For deployments of multiple instances of the user application 220 that are distributed across computer nodes 120 of the virtualized computing environment 100, there is illustratively one agent 330 (instance) per user application instance 220 such that agent has a view only of its client library 320 and associated user application instance. As a result, any single agent (instance) may not directly observe an entirety of activity occurring logically across a distributed user application (e.g., across all user application instances). Typically, for client/server web-based applications, a user sends a request that is received by a load balancer, which directs the request to an instance of the user application that is available to process the request. Accordingly, each agent 330 (instance) is unaware of the processing activity performed by the other agents with respect to the other instances of the user application 220. Note, however, that information (i.e., captured traces) across the instances is accumulated by and resides at the APS infrastructure 350, which can provide visibility and diagnostics across the entire distributed user application.

In one or more embodiments, the APS infrastructure 350 is organized as a plurality of components configured to perform substantial analysis and processing of the captured trace information (i.e., the substantially compressed traces). To that end, the APS infrastructure components are configured to provide, inter alia, durable and reliable storage of the captured information, as well as processing resources that may be allocated and applied (as needed) to facilitate analysis and further processing of the information, such as findings/conclusions, without impacting the user application environment. Illustratively, the APS infrastructure components include a consumer service 520 and a message queue 530. The consumer service 520 receives the substantially compressed traces (ingested information) from the agents 330 of the investigative platform 300, and immediately loads the ingested information as persistently stored message queue 530 configured to provide durable storage for the information. The message queue 530 may be configured to store the ingested information in several formats (such as compressed objects) for particular purposes, such as serving, analysis, and long-term archiving including the ability to automatically trigger reprocessing of a subset of the information on demand. Illustratively, the message queue 530 is embodied as persistent storage devices configured to provide reliability guarantees, e.g., via data protection schemes such as replication, erasure coding and the like, for information that may be stored for subsequent analysis and processing by the APS infrastructure in accordance with, e.g., historical/archival access. Notably, historical captured information may be selected and re-processed according to particular configurations of the analysis pipeline (i.e., arrangement of the analysis stages) as directed via the standard UI.

The APS infrastructure 350 further includes an analysis (e.g., data processing) pipeline 540 organized as a plurality of stages configured to enable fast, reliable and reproducible decompression, extraction, transformation and analysis of information. A decompression stage 542 of the pipeline retrieves the captured trace information from the substantially compressed traces, e.g., in the compressed object format, by decompressing the information for processing by analysis stages 544 of the pipeline. Illustratively, the message queue is archived according to a run of the user application. In an embodiment, the analysis stages 544 are deterministic and may be dynamically changed or reconfigured as needed to enable reproducible analysis (e.g., processing) of information. For example, if an anomaly (bug) in the executable code is discovered by a first run of an analysis stage, a second run of the analysis stage across a range of historical captured traces may be performed and compared, e.g., for comparative display on the UI infrastructure 360. In addition, improvements to the analysis stages themselves may be applied to archived/historical captured traces which may yield further and/or refined findings regarding the anomaly in the executable code.

Similarly, if a new or improved anomaly analysis (such as intelligent root cause determination or transforming or restructuring the representation of the captured trace information) is desired, the analysis stages 544*a*-*n* of the pipeline may be redeployed and reconfigured, i.e., to accommodate that analysis. In this manner, the stages of the analysis pipeline act as intelligent filters upon the captured information. For instance, an analysis stage 544*a* may be reconfigured as a classifier embodied as a user-defined sensitive data detector with heuristics capable of detecting potential personal identifiable information (PII). The captured information may be analyzed to flag potentially sensitive data, which may be leaked to unauthorized systems or components. Further, another analysis stage 544*n* may be reconfigured as a case classifier with heuristics configured to examine the anomalies (e.g., errors or failures) of traces stored in the message queue and derive case signatures used to group the traces with common anomalies to cases. As mentioned above, particular configurations of the analysis pipeline (i.e., versions and arrangements of the analysis stages) may be applied to the captured traces, which may include selected/filtered historical and/or archived traces.

In an embodiment, all information/data ingested into the analysis pipeline 540 may be available to reprocess at any time, subject to storage retention and storage cost policies (e.g., only retain the last week of ingested data). The information stored in the message queue 530 may be rerun through the pipeline 540 when one or more analysis stages is changed or reconfigured. To that end, each analysis stage 544 of the pipeline may be configured for a particular type of analysis as needed based on functionality provided by the investigative platform 300. That is, the analysis pipeline acts as a reconfigurable engine defined by an arrangement of particular versions of analysis stages through which any stored traces may be processed on demand. A stage may also be arranged to depend on one or more other stages when, e.g., adding new functionality to the platform. For example, an analysis stage 544*b* may be embodied as a PII Notifier configured to depend on the PII detector (stage 544*a*) to generate an alert when potential PII is detected. In response, the user may examine the alert and discover that it is a false positive (i.e., no PII was actually detected) or if the alert is accurate, take action to, e.g., redact the PII from any data transmissions.

A findings component 550 of the APS infrastructure 350 is coupled to the analysis pipeline 540 and configured to digest and provide conclusions from accumulated outputs of the pipeline for eventual presentations, notifications, diagnostics, recommended and/or requested actions displayed on the UI infrastructure 360. That is, processing by the analysis stages of the pipeline results in findings, such as trace amalgamation into cases. In an embodiment, the findings 550 may employ feedback loops to enable adjustments by the analysis stages 544 of the pipeline to adequately reprocess and respond to such presentations (e.g., serving traces and cases), notifications (e.g., detection of PII), diagnostics, recommendations (e.g., reduce application processor allocation) or requested actions (e.g., redaction of fields within cases). To ensure deterministic behavior and repeatability of the analyses, e.g., especially regarding the anomalies in the executable code, all of the information in the findings 550 may be regenerated at any time. The findings 550 thus provide a deterministic function of the ingested data (captured traces) and user preferences regarding actions taken in the UI infrastructure 360.

For instance, upon receiving an alert as to the PII detection, the user may decide to take action to extract or redact one or more fields of a formatted message used to transmit the information containing the PII. In response, for example, an appropriate analysis stage of the pipeline (e.g., the PII detector) may be further configured to redact certain PII fields by matching patterns of multi-digit sequences of predefined lengths. In particular, the detector may be configured to match data having 9-digit patterns as potential social security numbers (e.g., XXX-XX-XXXX) and/or having 10-digit patterns as potential phone numbers (e.g. NNN-NNN-NNNN). Such reprocessing of information by the analysis pipeline 540 provides diagnosis as to where (i.e., what method/data structure) leaked the PII, as well as ensures that no derived data containing the extracted or redacted fields exist post-ingestion within the APS infrastructure. Further, the APS infrastructure 350 may also update the dynamic configuration 420 loaded by the client library 320 to avoid capturing these fields in the future.

A data service 560 of the APS infrastructure is configured to serve as a repository of information derived from the findings 550 and to provide the processed information to the UI infrastructure 360 for graphic and interactive presentation reporting to a user. For example, cases produced by the analysis pipeline 540 may be provided to the data service 560 for subsequent serving to the UI infrastructure 360, which includes an administrator (admin) tool 570 and a standard UI 580. The admin tool 570 is configured to enable access controls for various users to specific data or projects in an organization, as well as to provide audit services with respect to audit logs, compliance, etc. The standard UI 580 provides an interface for a user to interact with the investigative platform 300 to explore cases, traces, etc. via one or more screenshots. Note that the data service 560 may render the screenshot displayed on the standard UI.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    instrumenting executable code of an application to capture traces of execution of the application on a computer node having a memory, wherein instrumenting of the executable code is in accordance with a capture configuration specifying a fidelity of trace capture;
    establishing one or more callbacks to a client library as one or more event-driven capture intervals of the traces during execution of the application, wherein the client library is loaded into a process of the application;
    capturing the traces of execution during the capture interval via the callback to the client library according to the capture configuration, wherein the traces include symbolic information selected from symbols as labels representing one or more of methods, variables, data or state of the executable code;
    sending the traces to an agent process via the callback to the client library, the agent process and application process executing on a same operating system;
    sending, by the agent process, the traces to an analysis and persistent storage (APS) infrastructure to analyze the traces and render findings; and
    presenting the findings to a user via a user interface infrastructure.

2. The method of claim 1, wherein the traces include one or more anomalies in the executable code, and wherein the findings present conclusions regarding the anomalies.

3. The method of claim 1, further comprising:
    compressing, by the callback, the captured traces using a first dictionary compression; and
    compressing, by the agent, using a second dictionary compression across a plurality of compressed traces received from the client library.

4. The method of claim 1, further comprising:
    organizing, by the APS infrastructure, received captured traces as a persistently stored message queue for processing by an analysis pipeline according to a first configuration to render the analysis of the traces; and
    archiving the message queue according to a run of the application.

5. The method of claim 4, further comprising:
    processing the message queue in stages of the analysis pipeline, wherein a first stage performs a decompression of captured traces in the message queue.

6. The method of claim 4, further comprising:
    accumulating analyses of the analysis pipeline in a findings component of the APS infrastructure; and
    providing, by the findings component, one or more conclusions regarding one or more anomalies in the executable code.

7. The method of claim 4 further comprising:
    replaying the persistently stored message queue using a second configuration of the analysis pipeline different from the first configuration.

8. The method of claim 4, wherein a stage of the analysis pipeline is configured to detect personal identifiable information.

9. The method on claim 1, wherein sending, by the agent, the traces to an analysis and persistent storage (APS) infrastructure further comprises:
    sending, by the agent, the traces to near-line cloud storage; and
    retrieving the traces from the near-line storage to send to the APS infrastructure.

10. The method of claim 1, further comprising:
    collecting, by a consumer of the APS infrastructure, traces sent from a plurality of agents.

11. A non-transitory computer readable medium including program instructions for execution on one or more processors, the program instructions configured to:
    instrument executable code of an application to capture traces of execution of the application on a computer node having a memory, wherein the executable code is instrumented in accordance with a capture configuration specifying a fidelity of trace capture;

establish one or more callbacks to a client library as one or more event-driven capture intervals of the traces during execution of the application, wherein the client library is loaded into a process of the application;

capture the traces of execution during the capture interval via the callback to the client library according to the capture configuration, wherein the traces include symbolic information selected from symbols as labels representing one or more of methods, variables, data or state of the executable code;

send the traces to an agent process via the callback to the client library, the agent process and application process executing on a same operating system;

send, by the agent process, the traces to an analysis and persistent storage (APS) infrastructure to analyze the traces and render findings; and present the findings to a user via a user interface infrastructure.

12. The non-transitory computer readable medium of claim 11, wherein the traces include one or more anomalies in the executable code, and wherein the findings present conclusions regarding the anomalies.

13. The non-transitory computer readable medium of claim 11, wherein the program instructions are further configured to:

compress, by the callback, the captured trace using a first dictionary compression; and compress, by the agent, using a second dictionary compression across a plurality of compressed traces received from the client library.

14. The non-transitory computer readable medium of claim 11, wherein the program instructions are further configured to:

organize, by the APS infrastructure, received captured traces as a persistently stored message queue for processing by an analysis pipeline according to a first configuration to render the analysis of the traces; and archive the message queue according to a run of the application.

15. The non-transitory computer readable medium of claim 14, wherein the program instructions are further configured to:

process the message queue in stages of the analysis pipeline, wherein a first stage performs a decompression of captured traces in the message queue.

16. The non-transitory computer readable medium of claim 14, wherein the program instructions are further configured to:

accumulate analyses of the analysis pipeline in a findings component of the APS infrastructure; and provide, by the findings component, one or more conclusions regarding one or more anomalies in the executable code.

17. A system comprising:

a node including a processor and a memory, the memory including an application having executable code linked to a client library with program instructions configured to, instrument the executable code to capture traces of execution of the application according to a capture configuration specifying a fidelity of trace capture;

establish one or more callbacks to the client library as one or more event-driven capture intervals of the traces during execution of the application, wherein the client library is loaded into a process of the application;

capture the traces of execution during the capture interval via the callback to the client library according to the capture configuration, wherein the traces include symbolic information selected from symbols as labels representing one or more of methods, variables, data or state of the executable code;

send the traces to an agent process via the callback to the client library, the agent process and application process executing on a same operating system;

send, by the agent process, the traces to an analysis and persistent storage (APS) infrastructure to analyze the traces and render findings; and present the findings to a user via a user interface (UI) infrastructure.

18. The system of claim 17 wherein the program instructions are further configured to:

organize, by the APS infrastructure, received captured traces as a persistently stored message queue for processing by an analysis pipeline according to a first configuration to render the analysis of the traces; and archive the message queue according to a run of the application.

19. The system of claim 18 wherein the program instructions are further configured to:

process the message queue in stages of the analysis pipeline, wherein a first stage performs a decompression of captured traces in the message queue.

20. The system of claim 18 wherein the program instructions are further configured to:

accumulate analyses of the analysis pipeline in a findings component of the APS infrastructure; and provide, by the findings component, one or more conclusions regarding one or more anomalies in the executable code.

* * * * *